United States Patent [19]

Yamazaki

[11] 4,004,848
[45] Jan. 25, 1977

[54] LIQUID CRYSTAL DISPLAY DEVICE

[75] Inventor: Yoshio Yamazaki, Shimosuwa, Japan

[73] Assignee: Kabushiki Kaisha Suwa Seikosha, Japan

[22] Filed: Mar. 13, 1974

[21] Appl. No.: 450,954

[30] Foreign Application Priority Data

Mar. 13, 1973 Japan .............................. 48-28507

[52] U.S. Cl. ........................ 350/160 LC; 252/299
[51] Int. Cl.² ...................... C09K 3/34; G02F 1/13
[58] Field of Search ................ 252/408 LC, 299; 350/160 LC

[56] References Cited

UNITED STATES PATENTS

| | | | |
|---|---|---|---|
| 3,731,986 | 5/1973 | Fergason | 252/408 LC |
| 3,773,747 | 11/1973 | Steinstrasser | 252/408 |
| 3,781,088 | 12/1973 | Tsukamoto et al. | 252/408 LC |
| 3,795,436 | 3/1974 | Boller et al. | 252/408 LC |
| 3,815,972 | 6/1974 | Hsieh | 252/408 |
| 3,853,391 | 12/1974 | Sorkin | 350/160 LC |
| 3,881,806 | 5/1975 | Suzuki | 252/299 |
| 3,891,306 | 6/1975 | Tsukamoto et al. | 350/160 LC |
| 3,960,752 | 6/1976 | Klanderman | 252/299 |

FOREIGN PATENTS OR APPLICATIONS

| | | | |
|---|---|---|---|
| 814,291 | 8/1974 | Belgium | 252/299 |
| 2,327,036 | 12/1973 | Germany | 252/299 |
| 2,024,269 | 12/1971 | Germany | 252/299 |

OTHER PUBLICATIONS de Jeu; W. H. and van der Veen; J., Philips Res. Repts., vol. 27, pp. 172-185, (Apr. 1972).

Primary Examiner—Benjamin R. Padgett
Assistant Examiner—T. S. Gron
Attorney, Agent, or Firm—Blum, Moscovitz, Friedman & Kaplan

[57] ABSTRACT

A liquid crystal display device comprises a cell of opposed plates, each of which is unidirectionally rubbed, the directions of rubbing being perpendicular to each other and polarizer and analyzer plates at the exterior surfaces of the cell. The cell contains a nematic liquid crystal composition having a net positive dielectric anisotropy. The liquid crystal composition consists of azoxy compounds and nitriles.

8 Claims, 1 Drawing Figure

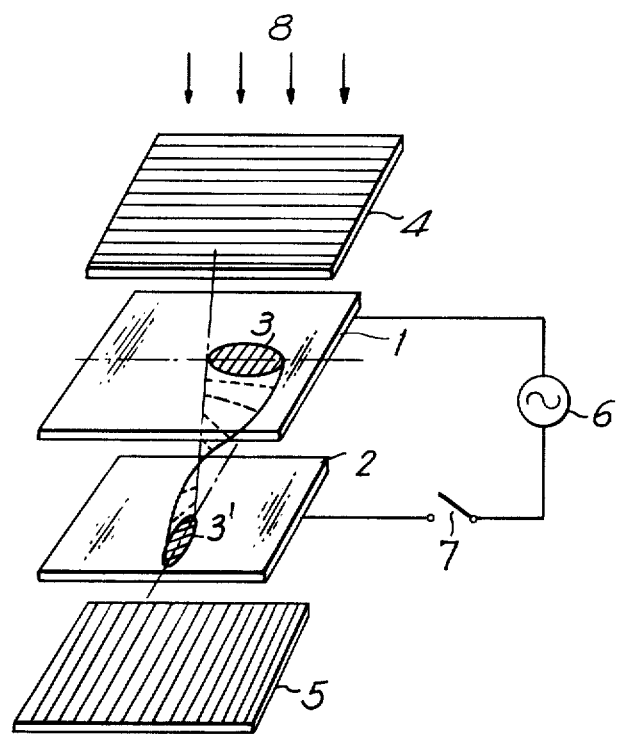

LIQUID CRYSTAL DISPLAY DEVICE

BACKGROUND OF THE INVENTION

Conventional liquid crystal display systems are generally of the DSM type. When an electric field is applied to a thin layer of nematic liquid crystals of negative dielectric anisotropy, migration of ions within the layer occurs as a result of which the liquid crystal layer is broken up into fine domains. Light-scattering takes place, then, due to double refraction at the boundaries of these domains. Owing to the fact that the voltage at which the light-scattering reaches saturation is relatively high, namely about 20 volts, and that the light-scattering depends basically on the flow of current, the life of such a device is relatively short. This disadvantage results from the fact that the current drawn soon exhausts the battery which is the usual source of power. Also, the fact that there is migration of ions and that the voltage is relatively high results in the formation of gases and the occurrence of both oxidation and reduction reactions at the conductive interior surfaces of the plates. All of these reactions cause degradation of the system. Consequently, a means of using nematic liquid crystals which does not depend upon ion conduction is desired.

SUMMARY OF THE INVENTION

A liquid crystal display device includes two opposed plates forming a cell in which is a nematic liquid crystal composition of positive dielectric anisotropy. At the outer surfaces of the liquid crystal cell are a pair of polarizer and analyzer plates. The polarization axes of the polarizer and analyzer plates may be either parallel to each other or perpendicular to each other.

The plates of the liquid crystal cell have been unidirectionally rubbed on the interior surfaces thereof. The directions of rubbing for the two plates are at right-angles to each other. As a result, when the cell contains liquid crystal materials of positive dielectric anisotropy the liquid crystal molecules adjacent each of the surfaces tend to align themselves with the rubbing directions at the plate surfaces. Since the rubbing directions on the two opposed plates are at right-angles to each other, the molecules between the plates form a quarter-turn of a helix, and the plane of polarization of plane-polarized light passing therethrough is rotated by 90°. On the interior surfaces of the two plates forming the cell are transparent electrodes of selected shapes, said electrodes being connectable to an outside source of voltage.

Application of a voltage of sufficient magnitude, whether direct or alternating, changes the liquid crystal compositions from optically active to optically inactive. As a result, in the absence of a field, when the axes of the polarizer and analyzer plates are parallel to each other, essentially no light will pass through the system. Applying a field of sufficient strength across the cell will render the liquid crystal composition optically inactive and light will pass therethrough. When the polarization axes of the polarizer and analyzer plates are perpendicular to each other, light passes through the cell in the absence of a field, and is blocked in the presence of a field.

Liquid crystal compositions in accordance with the present invention consists essentially of at least one azoxy and at least one ester nitrile, respectively, having the formulas:

$$R{-}O{-}\phenyl{-}N{=}N(O){-}\phenyl{-}R', \text{ equivalent to } R{-}O{-}\phenyl{-}N(O){=}N{-}\phenyl{-}R' \qquad I$$

$$R'{-}\phenyl{-}O{-}\underset{\underset{O}{\|}}{C}{-}\phenyl{-}C{\equiv}N \qquad II$$

In these formulas R' is a normal alkyl radical, $C_nH_{2n+1}$, and R is an alkyl radical, $C_nH_{2n+1}$ or an acyl radical, $$C_nH_{2n+1}\underset{\underset{O}{\|}}{C}-$$

In these formulas $n = 1-8$. One or more compounds of formula I and one or more compounds of formula II are used in preparing such a composition. The relative quantities must be such that the dielectric anisotropy of the composition is positive.

In general, compositions, instead of individual compounds, are used in order to extend the range between the melting point and the clearing point, and in order to include room temperature in said range.

Accordingly, an object of the present invention is a liquid crystal display device having a long life both as to stability of the liquid crystal composition used therein and the battery used as a power source.

A further object of the present invention is an improved liquid crystal display device utilizing a composition containing one or more azoxy compounds and one or more ester nitriles.

An important object of the present invention is an improved liquid crystal display device having a wide liquid crystal phase temperature range.

Still another object of the present invention is an improved liquid crystal display device wherein the light transmitted is of a light yellowish color.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

For a fuller understanding of the invention, reference is had to the following description taken in connection with the accompanying drawing, in which:

The single FIGURE shows an exploded perspective view of a device in accordance with the present invention.

DESCRIPTION OF THE PREFERRED EMBODIMENTS

In preparation for assembly of a device in accordance with the present invention, two plates, each having transparent conductive electrodes in selected patterns on one surface thereof, said electrodes being connectable to an outside source of voltage are each unidirectionally rubbed with gauze, cotton batting, etc. on the face having said transparent electrodes thereon. When such plates are brought into opposition with each other and separated by a short distance, and formed into a cell by means of a spacer around the periphery thereof, molecules of liquid crystals of positive dielectric anisotropy if introduced therebetween tend to align themselves with the rubbing directions of the plates. This alignment effect is strengthened by forming thin films of inorganic material such as silicon oxide and magnesium fluoride and of organic material such as Teflon resin on the interior faces of the plates. These plates are then unidirectionally rubbed to form scratches or grooves therein.

In the assembly of the plates to form a cell, the plates are positioned relative to each other so that the rubbing directions are at right-angles to each other. Consequently, when nematic liquid crystals of positive dielectric anisotropy are sealed between the electrodes, the molecules adjacent to each of the surfaces will align themselves with the rubbing directions, and the remaining molecules intermediate the plates will arrange themselves in a helix of one quarter turn. As a result, linearly-polarized light passing through the cell will be rotated by 90°. When a liquid crystal cell of the type described is placed between polarizer and analyzer plates which have their axes at right-angles to each other, light is transmitted by the system in the absence of a field. Conversely, if the polarizer and analyzer axes are parallel to each other, there will be no transmission of light through the system.

When an electric field is imposed across the cell by imposing an electric field between electrodes on opposite faces of the cell, the nematic liquid crystal composition between such electrodes loses its property of double refraction and becomes optically inactive. The mechanism by which this occurs is rotation of the molecules of positive dielectric anisotropy so that the long axes of such molecules are arranged parallel to the electric field. In the process, the molecules become in effect an isotropic liquid and the composition loses its optical activity. The combination of a liquid crystal display cell containing a liquid crystal composition of positive dielectric anisotropy then constitutes an electro-optical display where characters or indicia may be displayed at will by appropriate selection of the electrodes across which to impose an electric field.

In general, it is desired that the liquid crystal composition have a long mesomorphic phase, or temperature range over which the material is liquid and optically active in the absence of an imposed electric field. For this purpose it is usually necessary to combine liquid crystal materials of both positive and negative dielectric anisotropy. In accordance with the present invention at least one liquid crystal material of the azoxy type and one liquid crystal material of the ester nitrile type should be used. Following are representative structural formulas:

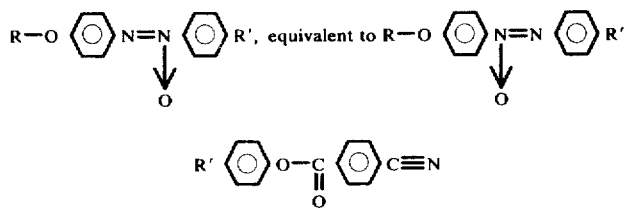

In the above formulas R' is a normal alkyl radical $C_nH_{2n+1}$, R is a normal alkyl radical $C_nH_{2n+1}$ or an acyl radical $$C_nH_{2n+1}\overset{\displaystyle}{\underset{\displaystyle O}{C-}},$$

where $C_nH_{2n+1}$ is a normal alkyl group of 1–8 carbon atoms.

The compound of formula I is a stable liquid crystal material of the azoxy type; however, because of the fact that it has a negative dielectric anisotropy it cannot be used by itself for a display in accordance with the present invention. The compound having the formula II is a white liquid crystal material which is a combination of an ester and a nitrile. It is due to the presence of the nitrile group that compounds of this structure have a strong positive dielectric anisotropy. By mixing compounds of the two types, a nematic composite with a net positive dielectric anisotropy is obtained. The product has a light yellowish color and a wide liquid crystal phase.

Owing to the excellent mutual compatibility of the two types of compounds herein specified, it is possible to obtain a liquid crystal phase temperature which includes not only room temperature but has a melting point as low as −10° C. Representative compounds of the two types are shown in Table 1.

TABLE I

| Compounds of Type I | m.p (° C) | c.p (° C) |
|---|---|---|
| P-methoxy-P'-n-butylazoxybenzene | 21 | 75 |
| P-butyloxy-P'-n-butylazoxybenzene | 37 | 91 |
| P-ethyl-P'-n-hexanoyloxyazoxybenzene | 47 | 77.5 |

| Compounds of Type II | m.p (° C) | c.p. (° C) |
|---|---|---|
| P-n-butylphenyl-P'-cyanobenzoate | 70 | 42 |
| P-n-amylphenyl-P'-cyanobenzoate | 68 | 58.5 |
| P-n-hexylphenyl-P'-cyanobenzoate | 68 | 50 |

TABLE I-continued

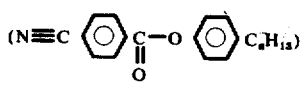

Note: c.p. indicates clearing point.

As is evident from Table I, the melting points of the compounds of type I are considerably lower than those of the compounds of type II. However, the melting point of all of the compounds is higher than normal room temperature.

Following are compositions showing the advantages of mixing compounds of the two types with respect to the operating temperature range secured thereby.

TABLE 2

|  | wt.% | m.p. (° C) | c.p. (° C) |
|---|---|---|---|
| P-Methoxy-P'-n-butylazoxybenzene | 50 | | |
| P-n-Propyl-P'-n-heptanoyloxyazoxybenzene | 30 | −5 | 70 |
| P-n-Butylphenyl-P'-cyanobenzoate | 20 | | |
| P-Methoxy-P'-n-amylazoxybenzene | 30 | | |
| P-Methoxy-P'-n-butylazoxybenzene | 50 | −3 | 65 |
| P-n-Hexylphenyl-P'-cyanobenzoate | 20 | | |
| P-Methoxy-P'-n-butylazoxybenzene | 50 | | |
| P-Methoxy-P'-ethylazoxybenzene | 30 | −10 | 60 |
| P-n-Butylphenyl-P'-cyanobenzoate | 10 | | |
| P-Cyanophenyl-P'-n-hexylbenzoate | 10 | | |

The first two compositions in Table 2 consists of three components each. The last composition consists of four compounds and can be used effectively down to −10° C.

In general, the total weight of compounds of type I should be from 40 to 98% and of compounds of Type II should be from 2 to 60%. A preferred range, however, is from 40 to 80% of one or more compounds of type I and from 20 to 60% of one or more compounds of type II.

There are several methods available for the synthesis of the azoxy-type liquid crystal compounds of type I. The following method is generally preferred:

Starting with the corresponding alkyl-substituted aniline as a base material, a P-(P'-hydroxyphenylazo)-phenylalkyl product is obtained by diazotization followed by a coupling reaction. The intermediate product is then subjected to a suitable alkylation reaction or a suitable esterification reaction with a saturated fatty acid and is carried on to a substitution with H of the hydroxyl radical. The azo compound thus produced is oxidized with acetic acid and hydrogen peroxide to obtain an azoxy liquid crystal compound. Compounds of type II are formed by starting with cyano-benzoic acid and alkyl phenol as base materials and esterifying by the usual techniques.

The compounds of both types are refined repeatedly by molecular evaporation and by recrystallization until the specific resistivity exceeds $10^{10}$ ohm·cm, at which point they are suitable for use in a display device in accordance with the present invention. It should be noted that where an alkyl group has 1 − 8 carbon atoms, the corresponding acyl group has 1 − 9 carbon atoms.

The principle of a liquid crystal display device in accordance with the present invention using the liquid crystal composites described herein is shown in the FIGURE. Nematic liquid crystals 3 and 3' are sealed between the inside surfaces of transparent electrodes 1 and 2. The surfaces 1 and 2 have been rubbed and are placed with respect to each other so that the rubbing directions make an angle of 90°. Polarizer filter 4 and analyzer filter 5 are placed respectively above and below the liquid crystal cell. Lead wires are taken out from electrodes 1 and 2 respectively and connected to a power source 6 where the circuit includes a switch 7. In the arrangement as shown, the liquid crystal cell has an optical activity of 90°. When the polarizing filters 4 and 5 have crossed axes, incident light 8 falling on the upper surface of polarizing filter 4 is transmitted through the system. Closing switch 7 to impose a voltage, preferably alternating, across electrodes 1 and 2 eliminates the optical activity from the liquid crystals and cuts off any transmission of the light. As will be seen from the single FIGURE, in the absence of an electric field the molecules of liquid crystal materials having a positive dielectric anisotropy are arranged in a helix of one quarter turn.

When the polarizer and analyzer plates 4 and 5 are parallel to each other, no light is transmitted through the system in the absence of an electric field, and the device becomes transmitting when an electric field in applied. It is also possible to provide a reflecting plate, i.e., a mirror at the back surface of the analyzer plate.

In a device of this type the threshold voltage is generally below 1.5 volts and the saturation voltage lies between 3 and 6 volts. The power consumption is about 0.5 microwatts/cm², resulting in a remarkable improvement with respect to power consumption of the device. Consequently, the device can be operated with small batteries and becomes completely portable. A variety of measuring instruments can be fashioned in this way. In a wristwatch, it is possible to provide a solid state electronic timepiece by combining a quartz oscillator, suitable frequency dividers, decoder-drivers and a liquid crystal cell, where the various electronic components are of the MOS-IC type. A wristwatch can be driven for more than one year with a miniature dry battery of 1.5 volts. The invention is also suitable for use in clocks, digital stop watches, pocket electronic calculators, table calculators, digital volt meters, pH meters, multimeters and so on.

Where the device is to be used in a wristwatch where it can be subjected to light from the sun, it is important to prevent ultraviolet light from falling thereon. In such cases, a suitable light filter which prevents transmission of ultraviolet light should be used in combination with the device.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A liquid crystal display device, comprising opposing electrode plates unidirectionally rubbed on the facing surfaces thereof, the rubbing directions being at right angles to each other, polarizer and analyzer plates at the exterior surfaces of said opposing electrode plates and a nematic liquid crystal composition having a positive dielectric anisotropy between said electrode plates, said composition consisting essentially of at least one compound having the formula

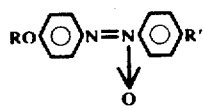
I and at least one compound having the formula

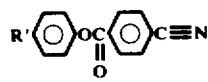
II where R' is a normal alkyl group having 1 – 8 carbon atoms, R is selected from the group consisting of normal alkyl groups having 1 – 8 carbon atoms and normal saturated acyl groups having 1 – 9 carbon atoms, the formula I is considered equivalent to

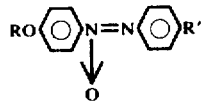
III

2. A liquid crystal display device as defined in claim 1 wherein the axes of said polarizer and analyzer plates are parallel to each other.

3. A liquid crystal display device as defined in claim 1 wherein the axes of said polarizer and analyzer plates are perpendicular to each other.

4. A liquid crystal display device as defined in claim 1 wherein said composition consists essentially of 40 – 98% of at least one compound having the formula I and 2 – 60% of at least one compound having the formula II, all quantities being by weight.

5. A liquid crystal display device as defined in claim 4 wherein said composition consists essentially of 40 – 80% of at least one compound having the formula I and 20 – 60% of at least one compound having the formula II, all quantities being by weight.

6. A liquid crystal display device as defined in claim 1 wherein said liquid crystal composition consists essentially of 50% P-Methoxy-P'-n-butylazoxybenzene, 30% P-n-Propyl-P'-n-heptanoyloxyazoxybenzene and 20% P-n-Butylphenyl-P'-cyanobenzoate, all quantities being by weight.

7. A liquid crystal display device as defined in claim 1 wherein said liquid crystal composition consists essentially of 30% P-Methoxy-P'-n-amylazoxybenzene, 50% P-Methoxy-P'-n-butylazoxybenzene and 20% P-n-Hexylphenyl-P'-cyanobenzoate, all quantities being by weight.

8. A liquid crystal display device as defined in claim 1 wherein said facing surface have thereon a coating of a compound selected from the group consisting of silicon oxides, MgF and Teflon.

* * * * *